US006378444B1

(12) United States Patent
Dastas et al.

(10) Patent No.: US 6,378,444 B1
(45) Date of Patent: Apr. 30, 2002

(54) RAIL VEHICLE BODY, A RAIL VEHICLE, AND CORRESPONDING ASSEMBLY METHODS

(75) Inventors: Laurent Dastas, La Rochelle; Emigliano Campus, Yves, both of (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/585,363

(22) Filed: Jun. 2, 2000

(30) Foreign Application Priority Data

Jun. 3, 1999 (FR) .............................. 99 07014

(51) Int. Cl.⁷ .............................................. B61D 17/00
(52) U.S. Cl. .................... 105/396; 105/400; 105/238.1; 296/205
(58) Field of Search ................. 105/396, 397, 105/399, 400, 401, 404, 407, 409, 238.1; 296/29, 30, 181, 183, 205; 52/648.1, 653.2, 281; 280/784

(56) References Cited

U.S. PATENT DOCUMENTS

| 481,715 A | * | 8/1892 | Lightford | 105/400 |
| 972,467 A | * | 10/1910 | McKeen | 105/397 |
| 2,507,421 A | * | 5/1950 | Rose | 296/29 |
| 2,658,776 A | * | 11/1953 | Wilcox | 52/281 |
| 3,021,159 A | | 2/1962 | Back | |
| 4,355,844 A | * | 10/1982 | Muzzarelli | 296/205 |
| 5,458,393 A | * | 10/1995 | Benedyk | 296/203 |
| 5,799,583 A | * | 9/1998 | Bieker | 105/401 |

FOREIGN PATENT DOCUMENTS

| DE | 1 950 086 | | 5/1970 | |
| EP | 0336781 A2 | * | 10/1989 | |
| EP | 0 780 279 A1 | | 6/1997 | |
| GB | 2028960 A | * | 3/1980 | ........... F16B/11/00 |
| GB | 2 147 680 a | | 5/1985 | |

* cited by examiner

Primary Examiner—S. Joseph Morano
Assistant Examiner—Frantz F. Jules
(74) Attorney, Agent, or Firm—Sughrue Mion, PLLC

(57) ABSTRACT

The invention relates to a rail vehicle body of the type comprising a grid structure, itself comprising longitudinal elements and cross elements interconnected at nodes, and supporting outer and inner coverings. Longitudinal and cross elements are circular section tubes. At at least some of its nodes, the grid structure comprises connections for interconnecting longitudinal and cross tubes of circular section. These connections have longitudinal and cross circular section sleeves which receive longitudinal and cross tubes respectively. Longitudinal tubes pass right through the connections made of longitudinal and cross tubes.

32 Claims, 5 Drawing Sheets

RAIL VEHICLE BODY, A RAIL VEHICLE, AND CORRESPONDING ASSEMBLY METHODS

The present invention relates to a rail vehicle body of the type comprising a grid structure, itself having longitudinal elements and cross elements interconnected at nodes, and supporting outer and inner coverings.

BACKGROUND OF THE INVENTION

In general, the longitudinal and cross elements of grid structures for bodies of the above type are channel-section or Ω-section bars.

To assemble the bars together at the nodes of the grid structure, it is generally necessary to cut them.

The nodes of grid structures for bodies of different models are disposed at different locations as a function in particular of the number and positions of windows in the body.

Thus, each new model of vehicle body requires a full new design and new plans.

Furthermore, assembly times and costs associated with such bodies are relatively high, firstly because of the impossibility of making use of automatic bending for the cross bars which need to be curved to match the rounded shape of the body to be obtained, and secondly because of the complexity of assembling the bars together at the nodes of the structure.

OBJECTS AND SUMMARY OF THE INVENTION

An object of the invention is to resolve those problems by providing a rail vehicle body of the above-specified type in which manufacturing time and costs are reduced, and in which the design principle can be reused for bodies of different dimensions and/or shapes, thereby limiting design costs specific to each type of body.

To this end, the invention provides a rail vehicle body of the above-specified type for mounting on a frame, wherein the longitudinal and cross elements of the grid structure are circular section tubes, wherein the grid structure comprises, at at least some of its nodes, connections for interconnecting longitudinal and cross tubes of circular section, wherein these connections have longitudinal and cross sleeves of circular section which receive the longitudinal and cross tubes respectively, and wherein longitudinal tubes pass right through said connections for interconnecting longitudinal and cross tubes.

In particular embodiments the rail vehicle body may include one or more of the following characteristics taken in isolation or in any technically feasible combination:

- the grid structure comprises cross hoops mad up of cross tubes of circular section;
- each of said cross hoops comprises a curved central tube of circular section located in a roof region of the body, circular section tubes curved more tightly than said central tube and extending said central tube sideways at ends of said central tube in cant-rail regions of the body, and circular section tubes extending the tubes of the cant-rail regions in the side wall regions;
- each of said cross hoops has cross tube connections which participate in connecting the central tube of the roof region to the tubes of the side wall regions, and the cross tube connections comprise circular section cross sleeves which receive said tubes of the roof region and of the side wall regions;
- said connections of the cross hoops are connections for interconnecting cross tubes and longitudinal tubes, and these connections comprise longitudinal sleeves of circular section which receive longitudinal tubes that pass right through said connections;
- the structure comprises welding gussets presenting bearing soleplates towards the outside of the body and on which the outer covering is welded;
- welding gussets are carried by circular section tubes of the grid structure;
- welding gussets are fixed to circular section tube connections of the grid structure;
- the outer covering is connected to the grid structure at least in part by adhesive;
- the outer covering is stuck directly to longitudinal elements and/or cross elements of the grid structure; and
- the outer covering is fixed to circular section tubes of said structure by resilient engagement.

The invention also provides a rail vehicle having a frame and a body on the frame, wherein said body is a body as defined above.

The invention also provides a method of assembling a body as defined above, wherein, to form said grid structure, longitudinal tubes are inserted in the longitudinal sleeves of said connections for interconnecting longitudinal and cross tubes, said connections are slid to the locations of the nodes of the structure, and said connections are fixed to the longitudinal tubes at said locations.

In particular implementations, the assembly method may include one or more of the following characteristics taken in isolation or in any technically feasible combination:

- cross tubes are assembled to the cross sleeves of at least some of said connections for interconnecting longitudinal and cross tubes prior to said connections being fixed at said locations of the nodes of the grid structure;
- circular section cross tubes are assembled together to form cross hoops of the grid structure;
- to form each of said cross hoops, a curved circular section central tube for placing in a roof region of the body is assembled to circular section tubes that are curved more tightly than said central tube and that are designed to occupy cant-rail regions of the body, and to circular section tubes for extending the tubes of the cant-rail regions into the side wall regions of the body;
- for each of said cross hoops, the central tube of the roof region is connected to the tubes of the side wall regions via cross tube connections which have circular section cross sleeves that receive said tubes of the roof region and of the side regions;
- said cross hoop connections are connections for interconnecting cross tubes and longitudinal tubes and have longitudinal sleeves of circular section, and in order to form said grid structure, longitudinal tubes are inserted in the longitudinal sleeves of said cross hoop connections, these connections are slid to the locations of the nodes of the structure, and these connections are fixed at said locations;
- cross tubes of cross hoops are assembled to the cross sleeves of at least some of said connections for interconnecting longitudinal and cross tubes of the cross hoops before said connections are fixed at said locations of the nodes of the grid structure;
- welding gussets are fixed to the grid structure with bearing soleplates of said gussets being directed towards the outside of the body, and then the outer covering of the body is welded to said soleplates;

welding gussets are fixed to the tube connections of the grid structure;

the outer covering is secured to the grid structure at least in part by means of adhesive;

the outer covering is stuck directly to longitudinal and/or cross elements of the grid structure; and the inner covering is assembled to the grid structure by resilient engagement on circular section tubes of said structure.

The invention also provides a method of assembling a vehicle as defined above, wherein the grid structure of the vehicle body is assembled using a method as defined above.

BRIEF DESCRIPTION OF THE DRAWINGS

The invention will be better understood on reading the following description given purely by way of example and given with reference to the accompanying drawings, in which.

MORE DETAILED DESCRIPTION

Figure 1:
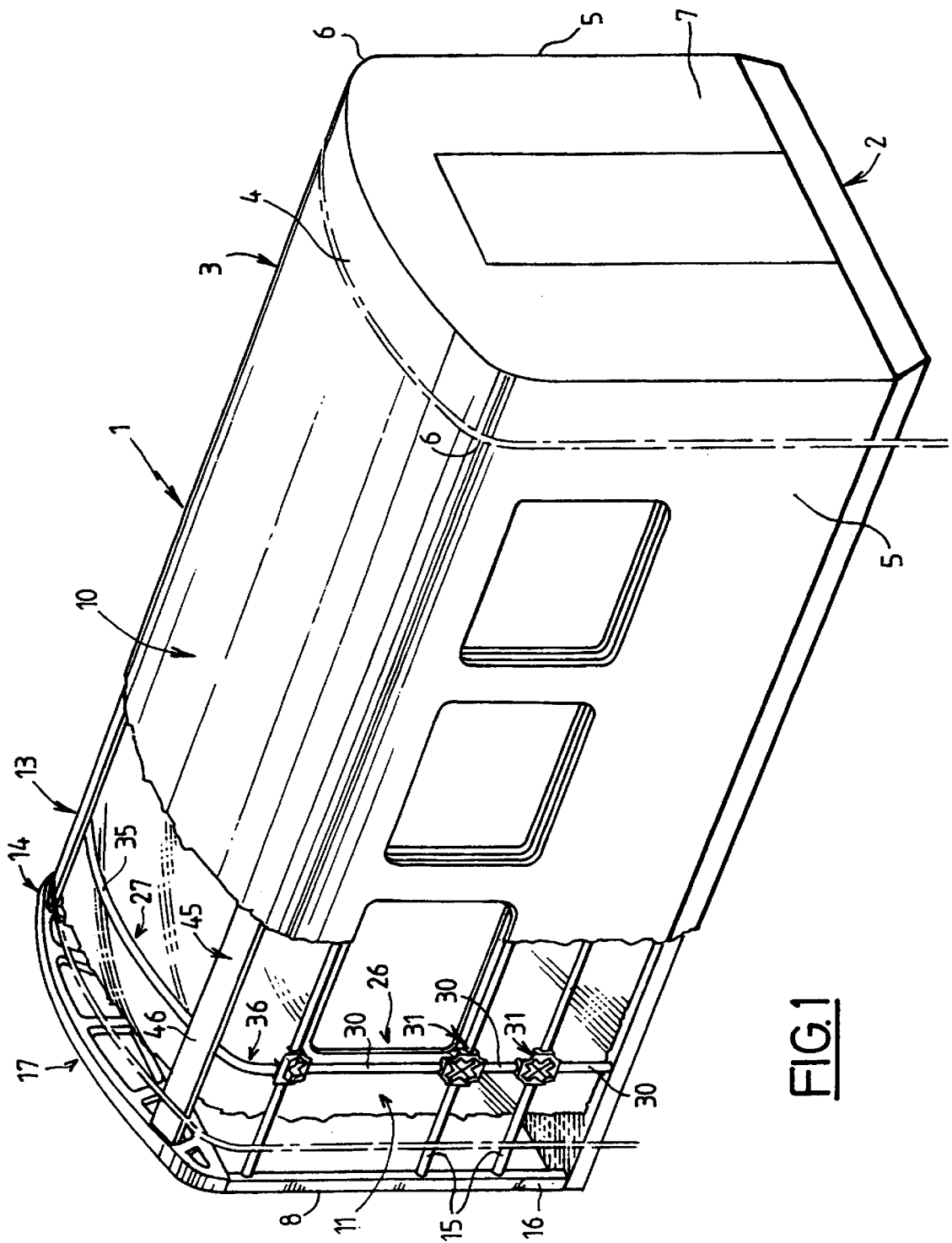
FIG. 1 is a partially cutaway diagrammatic perspective view of a vehicle of the invention.

FIG. 1 is a diagram showing a rail vehicle 1 which essentially comprises a frame 2 carrying a closed body 3 of cross section in the form of an upside-down U-shape.

The body 3 is made of black steel or of stainless steel, and has a roof 4, two side walls 5 connected to the frame 2, two roof cant-rails 6 each connecting a side wall 5 to the roof 4, a front end wall (in FIG. 1) 7, and a rear end wall 8.

FIG. 1 shows only portions of one longitudinal end and a central part of the vehicle 1 so as to facilitate drawing and description. For the same reasons, this vehicle is shown as having doors only in its front and rear end walls 7 and 8.

As can be seen by the cutaway portions of FIG. 1, the body 3 has a supporting structure or framework 9, an outer covering 10, and an inner covering 11 which are carried by the structure 9.

The inner covering 11 and the frame 2 define the passenger space of the rail vehicle 1.

Figure 2:
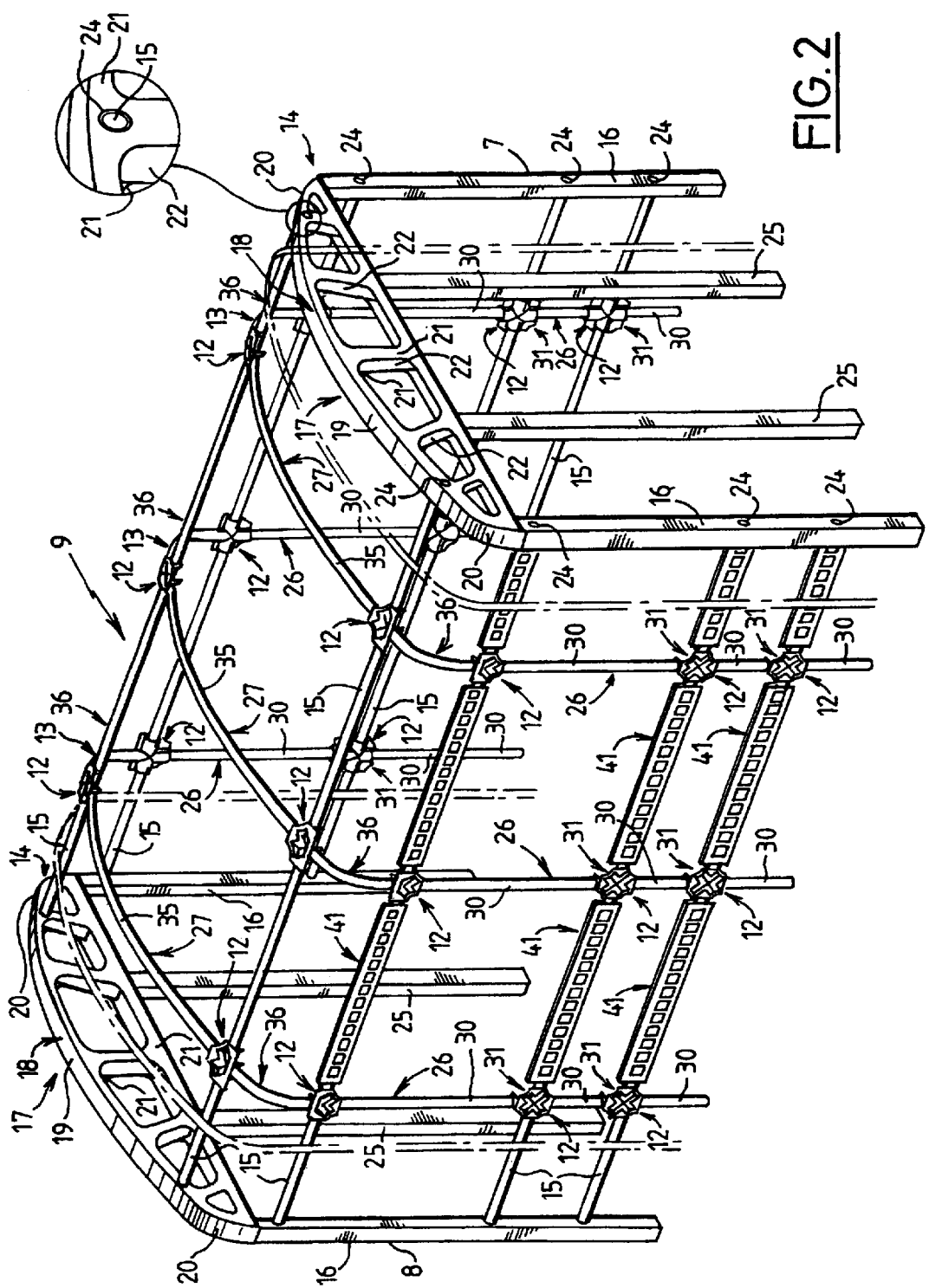
FIG. 2 is a diagrammatic perspective view of the grid structure of the body of the FIG. 1 vehicle.

FIG. 2 shows the structure 9 in greater detail, which structure is a grid structure having nodes 12 formed by cross points between intermediate or end cross hoops 13 or 14 and longitudinal elements 15 of the structure 9. It will be observed that the proportions in FIG. 2 are slightly different from those of FIG. 1, such that the central portion of the structure 9 is of a length corresponding to two windows per side wall 5 instead of three windows as in FIG. 1.

The longitudinal elements 15 are constituted by tubes of the same circular section which extend along the entire length of the vehicle 1 in the example shown that does not have any side doors.

In each side wall 5, the structure 9 has two longitudinal elements 15 and two longitudinal elements 15 in each roof cant-rail 6.

The end hoops 14 are level with the front and rear ends 7 and 8 of the structure 9.

Each of these hoops 14 has two side uprights 16 and a top central cross member 17 interconnecting the top ends of the uprights 16.

The uprights 16 are substantially vertical rectangular section bars that are connected at their bottom ends to the frame 2.

The central cross member 17 has a top core 18 presenting a central region 19 of relatively small curvature corresponding to that of the roof 4, and two side regions 20 of relatively sharp curvature corresponding to that of the roof cant-rails 6.

Two perforated plates 21 are disposed longitudinally on either side of the core 18 and sandwiched between them, there are reinforcing plates 22 and two longitudinal sleeves 24, as can be seen more particularly in the enlarged detail shown in a circle in FIG. 2. These circular section sleeves 24 have an inside diameter that is slightly greater than the outside diameter of the longitudinal elements 15.

Three analogous longitudinal sleeves 24 are also located in cutouts formed by laser in each of the uprights 16.

These sleeves 24 receive internally the front ends of the longitudinal elements 15 in the front end hoop 14, and the rear ends of the longitudinal elements 15 in the rear end hoop 14.

Two vertical uprights 25 disposed between the uprights 16 connect the frame 2 to each of the central cross members 17 so as to form a frame for a door in the longitudinal end.

The intermediate hoops 13 are regularly spaced apart between the end hoops 14 along the entire length of the vehicle 1, and each of them has two side uprights 26 that are substantially vertical together with a top central cross member 27.

Each of the uprights 26 has three tubes 30 of the same circular section as the longitudinal elements 15, i.e. two short tubes 30 and one longer tube 30 located level with a window in the corresponding side wall 5. These tubes 30 are interconnected and are connected to the longitudinal elements 15 of the corresponding side wall 5 by connections 31.

Figure 3:
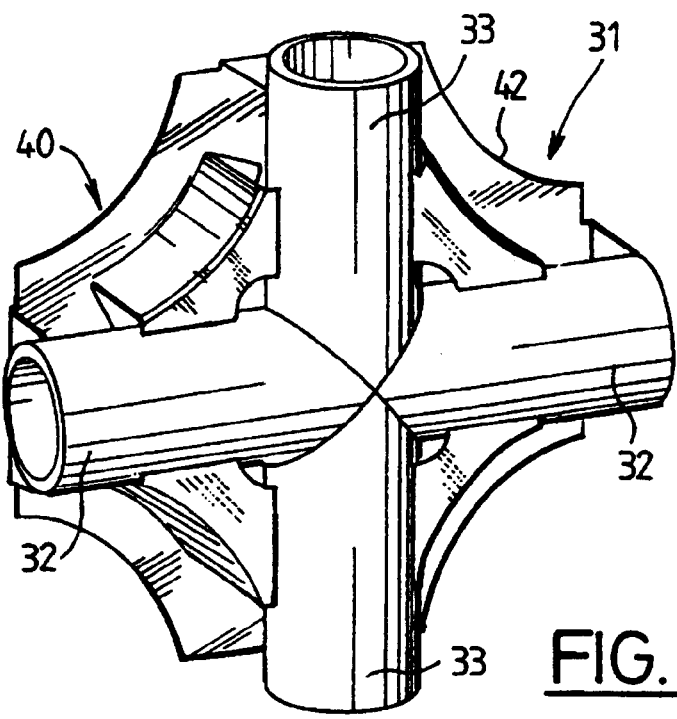
FIGS. 3 and 4 are views on a larger scale showing connections in the grid structure of FIG. 2.

FIG. 3 shows one of these connections 31 which comprises four sleeves having the same circular section and disposed in a cross configuration, i.e. two longitudinal sleeves 32 that are in line with each other, and two crossing sleeves 33 that are likewise in line with each other and that are disposed orthogonally to the longitudinal sleeves 32. The inside diameter of the sleeves 32 and 33 is slightly greater than the outside diameter of the longitudinal elements 15.

Figure 5:
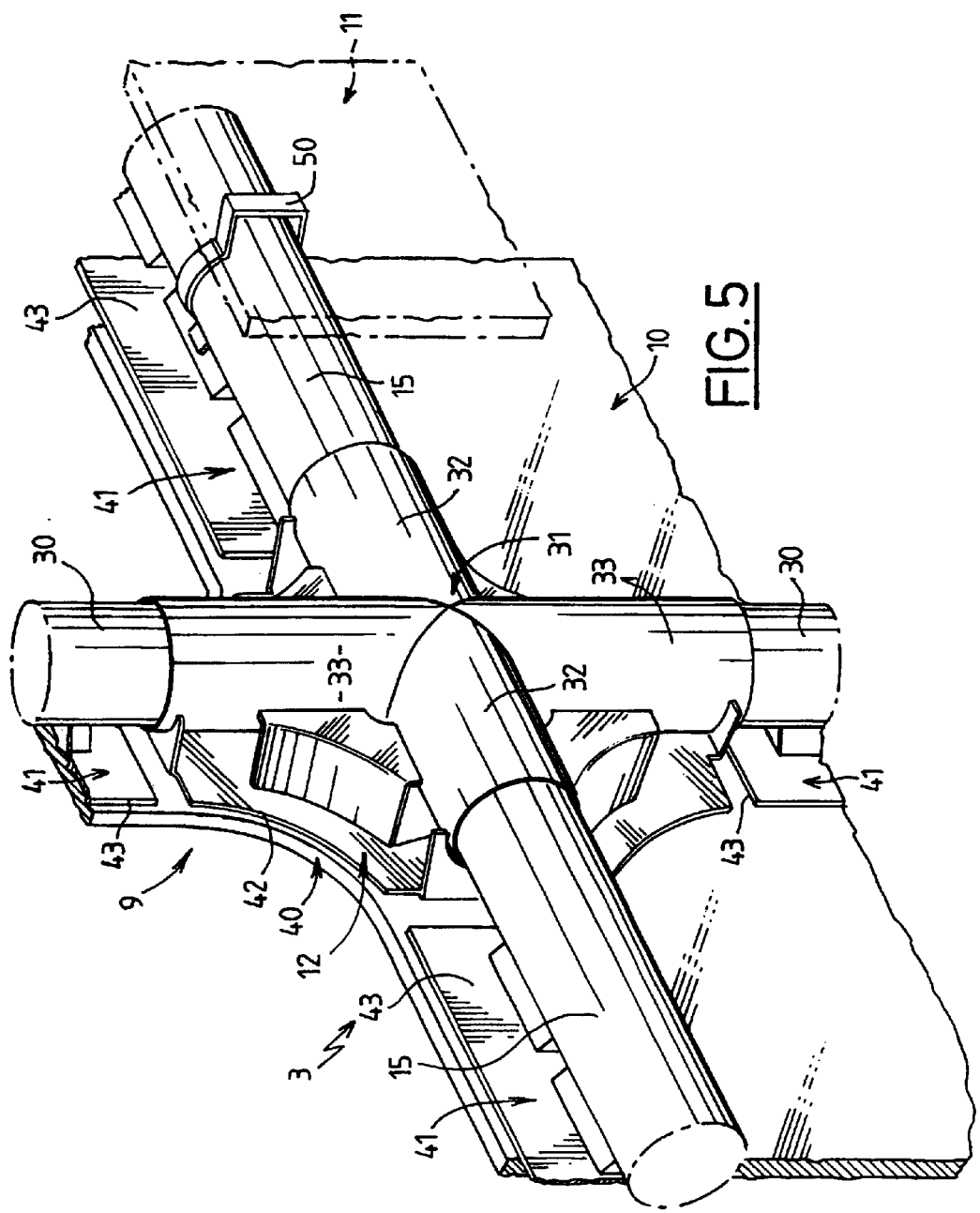
FIGS. 5 and 6 are perspective views on a larger scale showing the links between the grid structure and the outer and inner coverings of the body of FIG. 1.

As shown in FIGS. 2 and 5, each of these connections 31 has a longitudinal element 15 inserted in the two longitudinal sleeves 32 passing right through the connection 31, and a vertical tube 30 is inserted in each of the cross sleeves 33. A node 12 of the structure 9 is thus formed at each of these connections 31.

The top central cross member 27 comprises:

a central tube 35 having the same circular section as the tubes 30 and the longitudinal elements 15, and which is relatively lightly curved so as to correspond to the curvature of the roof 4; and two connections 36 disposed at each end of the central tube 35.

Figure 4:
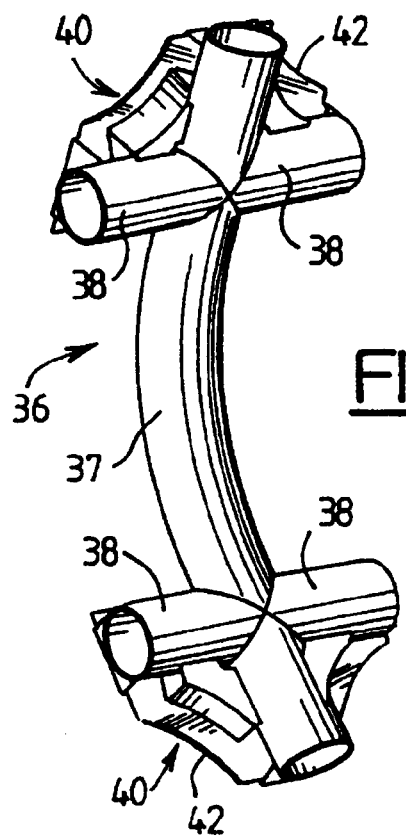

As shown in FIG. 4, each connection 36 comprises a cross sleeve 37 that is curved with relatively tight curvature corresponding to that of the cant-rails 6, and four longitudinal sleeves 38 that are orthogonal to the cross sleeve 37 and that are aligned in pairs in the vicinity of each end of the cross sleeve 37.

Figure 6:
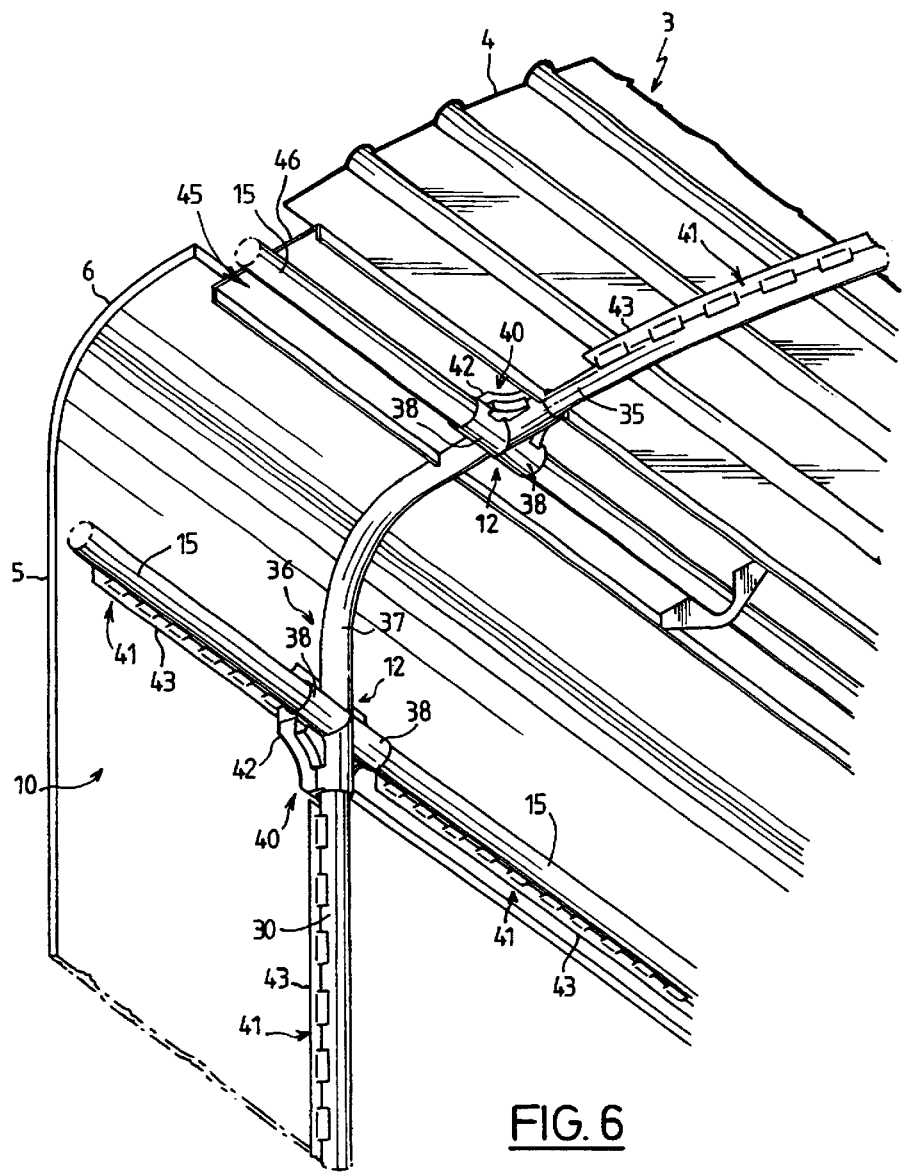

As shown in FIGS. 2 and 6, for each of these connections 36, the longitudinal elements 15 of the corresponding cant-rail 6 are each inserted in two of the longitudinal sleeves 38 passing right through the connection 36. Furthermore, the central tube 35 of the corresponding central cross member 27 is inserted in the top end of each cross sleeve 37 while the top tube 30 of the corresponding upright 26 is inserted in the bottom end of the cross sleeve 37.

Thus, a node 12 of the structure 9 is formed at each pair of longitudinal sleeves 38 of the connection 36.

As shown in FIGS. 5 and 6, the grid structure 9 also has:
- at most of the nodes 12, gussets 40 for welding to the outer covering 10; and
- on the running portions of the tubes 30 and 35 and of the majority of the longitudinal elements 15, gussets 41 for welding to the outer covering 10.

By way of example, the gussets 40 are formed by stamping sheet metal and they are welded to the connections 31 and 36. Each of these gussets 40 has a plane bearing soleplate 42 (FIGS. 5 and 6) towards the outside of the body 3 and on which the outer covering 10 is welded.

The gussets 31 are formed by folded and/or rolled pieces of metal sheet welded to the running portions of the longitudinal elements 15 and of the tubes 30 and 35. Each of the gussets has a plane bearing soleplate 43 towards the outside of the body 3 to which the outer covering 10 is welded.

It should be observed that only some of the gussets 41 are shown in FIG. 2.

The longitudinal elements 15 disposed on either side of the tubes 35 of the inner hoops 13 are provided with respective continuous welding gussets 45, as are the corresponding nodes 12 of the structure 9, said gussets being in the form of sheet metal covering the outside of the longitudinal elements 15 in question and said nodes 12. It should be observed that each gusset 45 is welded at the corresponding node 12 to the gussets 40 of the connections 36. Each of these gussets 45 has a continuous plane bearing soleplate 46 towards the outside of the body 3 and on which the outer covering 10 is welded.

The inner covering or "lining" 11 is fixed by snap-fastening or resilient engagement to the circular section tubes of the structure 9, as shown in FIG. 5 where a snap-fastening clip 50 can be seen. This clip 50 is carried by the inner covering 11 and is fixed on a longitudinal element 15.

To build the vehicle 1 of FIG. 1, it is possible to proceed as described below.

Initially:
- the frame 2 is made in conventional manner; and
- a roof module is built by welding together the top central cross members 17 of the end hoops 14, the top central cross members 27 of the intermediate hoops 13, the two longitudinal elements 15 disposed on either side of the roof 4, and the gussets 45.

While the roof module is being built, the two longitudinal elements 15 in question are inserted through the sleeves 38 of the connections 36 of the top central cross members 27. Thereafter, these central cross members 27 are slid along the two longitudinal elements 15 to take up their respective locations, and the connections 36 are then welded to the two longitudinal elements 15.

It should be observed that the connections 36 of the central cross members 17 are previously fitted with their gussets 40.

Thereafter, the uprights 16 of the end hoops 14 are welded to the frame 2, and then said roof module is welded to these uprights 16 via the cross members 17 of the end hoops 14.

The other longitudinal elements 15 are then inserted in the sleeves 24 of the end hoops 14, i.e. the two remaining longitudinal elements 15 of the cant-rails 6 which are likewise inserted through the bottom longitudinal sleeves 38 of the connections 36, and the longitudinal elements 15 of the side walls 5 which are fitted with the connections 31 that are free to slide therealong.

The front and rear ends of the longitudinal elements 15 are welded to the end hoops 14.

Thereafter, the vertical tubes 30 are inserted in the corresponding connections 31 and 36 to terminate the intermediate hoops 13.

The ability of the connections 31 to slide along the longitudinal elements 15 makes it easy to fit the vertical tubes 30.

Once the tubes 30 are properly positioned, the connections 31 are welded to the vertical tubes 30 and to the longitudinal elements 15 and the connections 36 are welded to the top vertical tubes 30 of the uprights 26.

Thereafter the gussets 41 are welded to the longitudinal elements 15, the tubes 30, and the tubes 35, while the gussets 40 were previously welded to the connections 31.

Thereafter, the outer covering is welded to the soleplates 42, 43, and 46 of the gussets 40, 41, and 45 and to the uprights 16 of the end hoops 14.

Finally, the inner covering 11 is fixed to the structure 9 by means of clips.

Because circular section tubes are used to form most of the longitudinal and cross elements of the structure, these parts can be curved in totally automatic manner, even if they have relatively large diameters.

The longitudinal and cross elements are simple to assemble together at the nodes 12 and there is no need to cut the longitudinal elements as a function of the positions of the nodes 12.

Furthermore, the connections 31 and 36 can be positioned along the longitudinal elements 15 accurately by sliding, since the circular sections of the longitudinal sleeves of the connections 31 and 36 and of the tubes 15 ensure good sliding.

The use of circular section tubes 15 and 30 also makes it possible to secure the inner covering 11 to the grid structure 9 by means of clips.

The body 3 is thus simple and fast to assemble and it requires few tools.

In addition, the structure 9 is very strong because of the great mechanical strength of circular section tubes.

It should also be observed that the design of the body 3 enables it to be adapted to different vehicles while limiting the amount of specific design required. The same design principle can be used for different bodies merely by modifying the parameters applied to curving and cutting the cross elements.

In particular, for bodies that differ solely in length and/or number of windows, it suffices to modify the positions and/or number of the cross hoops without this modification requiring any modification to be longitudinal elements used, as would be necessary with longitudinal elements in the form of channel-section or Ω-section bars that need to be precut at the locations of the nodes.

Thus, the body 3 of FIGS. 1 to 6 makes it possible to manufacture rail vehicles at relatively low cost and in relatively short time.

It should also be observed that the longitudinal and cross elements of the body are common products, that elements specific to any one model of body are limited, and that the body 3 can easily be transported in the form of a kit for assembly after transport.

In variants of the assembly method, the positions of the connections 31 and 36 can be fixed temporarily prior to being welded to the longitudinal elements 15, e.g. by means of pins.

The body described does not have any side doors. Nevertheless, such doors can easily be incorporated by placing frames within the grid structure 9. These frames can be made, for example, either from circular section tubes connected to the remainder of the structure 9 by connections constituted by circular section sleeves in a T-configuration, or from rectangular section bars fitted with sleeves 49 for receiving other tubes of the structure.

In a variant of the invention, the outer covering 10 is fixed to the running portions of at least some of the longitudinal and cross elements 15 and 30 of the side walls 5 by means of adhesive, i.e. without using the gussets 41.

What is claimed is:

1. A rail vehicle body having a grid structure, said rail vehicle body comprising:
    longitudinal tubes and vertical tubes which are coupled together at nodes, and which support an outer covering, wherein said longitudinal tubes and vertical tubes respectively have circular sections;
    cross tubes having circular sections coupled with said vertical tubes; and
    first connections formed at a plurality of said nodes which interconnect said longitudinal tubes and vertical tubes, wherein said first connections have circular longitudinal sleeves and circular cross sleeves which receive said longitudinal tubes and vertical tubes, respectively, and wherein said longitudinal tubes pass right through said first connections, such that said longitudinal tubes are not in fluid communication with said vertical tubes, and such that said longitudinal tubes and said vertical tubes do not overlap each other.

2. A body according to claim 1, wherein said grid structure comprises cross hoops made up of said cross tubes.

3. A body according to claim 2, wherein each of said cross hoops further comprises:
    a curved central tube having a circular section, said central tube being located in a roof region of said body;
    first circular section tube portions which are curved more tightly than said central tube and which extend from said central tube sideways at ends of said central tube in cant-rail regions of said body, and which further extend into a direction of said vertical tubes in side wall regions of said body.

4. A body according to claim 3, wherein each of said cross hoops has second connections which act as a portion of said first circular section tube portions, and participate in connecting said central tube of the roof region to said vertical tubes of the side wall regions, and wherein said second connections comprise circular section cross sleeves which receive said central tube of the roof region and said vertical tubes of said side wall regions.

5. A body according to claim 4, wherein said second connections of said cross hoops further include longitudinal sleeves having circular sections which receive additional longitudinal tubes that pass right through the second connections.

6. A body according to claim 1, wherein said grid structure comprises welding gussets presenting bearing soleplates towards an outside of said body and on which said outer covering is welded.

7. A body according to claim 6, wherein said welding gussets are carried by one of said longitudinal tubes, said vertical tubes and said cross tubes of said grid structure.

8. A body according to claim 6, wherein said welding gussets are fixed to one of said first connections and said second connections of said grid structure.

9. A body according to claim 1, wherein the outer covering is connected to the grid structure at least in part by adhesive.

10. A body according to claim 9, wherein said outer covering is stuck directly to at least one of said longitudinal tubes, said vertical tubes and said cross tubes of said grid structure.

11. A body according to claim 1, wherein said outer covering is fixed to one of said longitudinal tubes, said vertical tubes and said cross tubes of said grid structure by resilient engagement.

12. A body according to claim 1, wherein said grid structure forms a frame.

13. A method of assembling a rail vehicle body, having a grid structure, comprising:
    providing first connections having longitudinal sleeves for supporting longitudinal tubes, and providing cross sleeves for supporting vertical tubes;
    inserting longitudinal tubes having a circular section into respective said longitudinal sleeves of said first connections;
    sliding said first connections to locations of first nodes of said grid structure;
    fixing said first connections to the longitudinal tubes at said locations of said first nodes;
    inserting a vertical tube having a circular section into at least one of said cross sleeves;
    supporting an outer covering on said grid structure;
    preventing said longitudinal tubes from being in fluid communication with said vertical tubes; and
    arranging said longitudinal tubes and said vertical tubes such that they do not overlap each other.

14. A method according to claim 13, further comprising:
    assembling at least one of said vertical tubes to at least one of said cross sleeves of one of said first connections, having a respective one of said longitudinal tubes, so that said one of said vertical tubes is slidably coupled with said respective one of said longitudinal tubes prior to said fixing of said first connections to said longitudinal tubes at said locations of said first nodes.

15. A method according to claim 13, further comprising:
    assembling together cross tubes having a circular section to form cross hoops of said grid structure.

16. A method according to claim 15, wherein said assembling of said cross tube further comprises;
    placing a curved central tube having a circular section in a roof region of said body;
    forming first tube portions, which respectively have a circular portion, and which respectively extend from said central tube, and which are curved more tightly than said central tube so as to occupy cant-rail regions of said body; and
    coupling said first tube portions to said vertical tubes for making extensions from the cant-rail regions into side wall regions of said body.

17. A method according to claim 16, further comprising:
    connecting, for each of said cross hoops, said central tube of the roof region to said vertical tubes of the side wall regions via second connections, which act as said first tube portions, and which have circular section cross sleeves that receive said central tubes of the roof region and said vertical tubes of the side regions.

18. A method according to claim 17, further comprising:
inserting additional longitudinal tubes into longitudinal sleeves having a circular section, of said second connections;
sliding said second connections to locations of second nodes of said structure; and
fixing said second connections at said locations of said second nodes.

19. A method according to claim 18, further comprising:
assembling said cross tubes of said cross hoops of at least some of said second connections before said second connections are fixed at said locations of said second nodes of said grid structure.

20. A method according to claim 13, further comprising:
fixing welding gussets to said grid structure, such that bearing soleplates of said gussets are directed towards an outside of said body; and
welding an outer covering of said body to said soleplates.

21. A method according to claim 20, further comprising:
fixing said welding gussets to one of said first connections and said second connections of said grid structure.

22. A method according to claim 13, further comprising:
securing an outer covering to said grid structure at least in part by means of an adhesive.

23. A method according to claim 22, further comprising:
sticking, directly, said outer cover to one of said longitudinal tubes, said vertical tubes and said cross tubes of said grid structure.

24. A method according to claim 13, further comprising:
assembling an inner cover to said grid structure by resilient engagement on one of said longitudinal tubes, said vertical tubes and said cross tubes of said grid structure.

25. A method of assembling a rail vehicle comprising a frame and a body on the frame, said body comprising a grid structure, itself having longitudinal elements and cross elements interconnected at nodes, and supporting outer and inner coverings, wherein the longitudinal and cross elements of the grid structure are circular section tubes, wherein the grid structure comprises, at at least some of its nodes, connections for interconnecting longitudinal and cross tubes of circular section, wherein these connections have longitudinal and cross sleeves of circular section which receive the longitudinal and cross tubes respectively, and wherein longitudinal tubes pass through said connections made up of longitudinal and cross tubes, wherein the grid structure of the body of the vehicle is assembled by:
inserting longitudinal tubes in the longitudinal sleeves of said connections for interconnecting longitudinal and cross tubes;
sliding said connections to the locations of the nodes of the structure;
preventing said longitudinal tubes from being in fluid connection with said cross tubes;
arranging said longitudinal tubes and said vertical tubes such that they do not overlap each other; and
fixing said connections to the longitudinal tubes at said locations.

26. A rail vehicle body having a grid structure, said rail vehicle body comprising:
longitudinal tubes and cross tubes which are coupled together at nodes, and which support an outer covering, wherein said longitudinal tubes and cross tubes respectively have circular sections; and
first connections formed at a plurality of said nodes which interconnect said longitudinal tubes and said cross tubes, wherein said first connections have circular longitudinal sleeves and circular cross sleeves which receive said longitudinal tubes and cross tubes, respectively, and wherein said longitudinal tubes pass right through said first connections,
wherein said grid structure comprises cross hoops which include said cross tubes having circular sections, and
wherein each of said cross hoops further comprises:
a curved central tube having a circular section, said central tube being located in a roof region of said body; and
first circular section tube portions which are curved more tightly than said central tube and which extend from said central tube sideways at ends of said central tube in cant-rail regions of said body, and which further extend into side wall regions of said body.

27. A body according to claim 26, wherein each of said cross hoops has second connections, which act as a portion of said first circular section tube portions, and participate in connecting said central tube of the roof region to cross tubes which extend into the side wall regions, and
wherein said second connections comprise circular section cross sleeves which receive said central tube of the roof region and said cross tubes which extend into the side wall regions.

28. A body according to claim 27, wherein said second connections of said cross hoops further include longitudinal sleeves having circular sections which receive additional longitudinal tubes that pass right through said second connections.

29. A method of assembling a rail vehicle body having a grid structure, the rail vehicle body including longitudinal tubes and cross tubes which are coupled together at nodes, and which support an outer covering, wherein the longitudinal tubes and cross tubes respectively have circular sections; and
first connections formed at a plurality of the nodes which interconnect the longitudinal tubes and the cross tubes, wherein the first connections have circular longitudinal sleeves and circular cross sleeves, which receive the longitudinal tubes and the cross tubes, respectively, and wherein the longitudinal tubes pass right through the first connections, comprising the steps of:
inserting the longitudinal tubes having a circular section into the longitudinal sleeves of the first connections;
sliding the first connections to locations of first nodes of the grid structure;
fixing the first connections to the longitudinal tubes at the locations of the first nodes;
inserting the cross tubes into the cross sleeves;
assembling together the cross tubes to form cross hoops of the grid structure,
wherein said assembling of the cross tubes further comprises:
placing a curved central tube having a circular section in a roof region of the body;
forming first tube portions, which respectively have a circular portion, and which respectively extend from the central tube, and which are curved more tightly than the central tube so as to occupy cant-rail regions of the body; and
extending the first tube portions of the cant-rail regions to cross tubes of side wall regions of the body.

30. A method according to claim 29, further comprising:

connecting, for each of the cross hoops, the central tube of the roof region to the cross tubes of the side wall regions via second connections, which act as the first tube portions, and which have circular section cross sleeves which receive the central tubes of the roof region and the cross tubes of the side regions.

31. A method according to claim 30, further comprising:

inserting additional longitudinal tubes into longitudinal sleeves of the second connections, the longitudinal sleeves of the second connections having a circular section;

sliding the second connections to locations of second nodes of the grid structure; and fixing the second connections at the locations of the second nodes.

32. A method according to claim 31, further comprising:

assembling the cross tubes of the cross hoops of at least some of the second connections before said fixing of the second connections at the locations of the second nodes of the grid structure.

* * * * *